(12) United States Patent
Jährling

(10) Patent No.: US 6,643,900 B2
(45) Date of Patent: Nov. 11, 2003

(54) QUICK FIXING ELEMENT

(75) Inventor: Peter Jährling, Bünde (DE)

(73) Assignee: Paul Hettich GmbH & Co., Kirchlengern (DE)

( * ) Notice: Subject to any disclaimer, the term of this patent is extended or adjusted under 35 U.S.C. 154(b) by 0 days.

(21) Appl. No.: 09/861,532

(22) Filed: May 22, 2001

(65) Prior Publication Data

US 2001/0044992 A1 Nov. 29, 2001

(30) Foreign Application Priority Data

May 26, 2000 (DE) ..................................... 200 09 395 U
Jun. 7, 2000 (DE) ..................................... 200 10 037 U

(51) Int. Cl.⁷ .......................... A44B 21/00; A44B 17/00
(52) U.S. Cl. .............................. 24/563; 24/336; 24/339; 24/545; 248/317
(58) Field of Search ......................... 24/563, 336, 337, 24/338, 339; 248/317; 238/67

(56) References Cited

U.S. PATENT DOCUMENTS

| | | | | |
|---|---|---|---|---|
| 3,231,076 A | * | 1/1966 | Freiman | 206/46 |
| 3,346,688 A | * | 10/1967 | Fields | 174/68 |
| 4,723,749 A | * | 2/1988 | Carraro et al. | 248/317 |
| 5,056,198 A | * | 10/1991 | Viglione | 24/336 |
| 5,181,297 A | * | 1/1993 | Andrews, Jr. et al. | 24/336 |
| 5,263,671 A | | 11/1993 | Baum | |
| 5,331,725 A | * | 7/1994 | Chou | 24/545 |
| 5,639,049 A | * | 6/1997 | Jennings et al. | 24/563 |
| 5,836,055 A | * | 11/1998 | Cooper | 24/339 |
| 6,128,843 A | * | 10/2000 | Gebka | 24/339 |

FOREIGN PATENT DOCUMENTS

| | | | | |
|---|---|---|---|---|
| DE | 0947022 | * | 8/1956 | 24/336 |
| DE | 2701879 | | 7/1978 | |
| DE | 4227585 | | 2/1994 | |
| EP | 518540 | | 12/1992 | |
| FR | 1335491 | | 8/1963 | |
| FR | 2443197 | | 7/1980 | |
| GB | 0885372 | * | 12/1961 | 24/339 |
| GB | 0833125 | * | 4/1980 | 24/339 |
| GB | 2311664 | | 10/1997 | |

OTHER PUBLICATIONS

European Search Report (EP1158185A3) citation of documents page listing seven references, May 8, 2002.

* cited by examiner

Primary Examiner—Victor Sakran
(74) Attorney, Agent, or Firm—Barnes & Thornburg

(57) ABSTRACT

A quick-fixing element for fastening guide rails on lattice-like lateral parts includes an upper holding section which reaches at least partially around a first rod of a lateral part, and a lower holding section which reaches at least partially around a second rod of the lateral part which extends essentially parallel to the first rod. A nose is provided between the upper and the lower holding section, which nose rests on the second lower rod or rods of the lateral part. The quick-fixing element is held securely on the lateral part and can also be used for different lattice types.

2 Claims, 7 Drawing Sheets

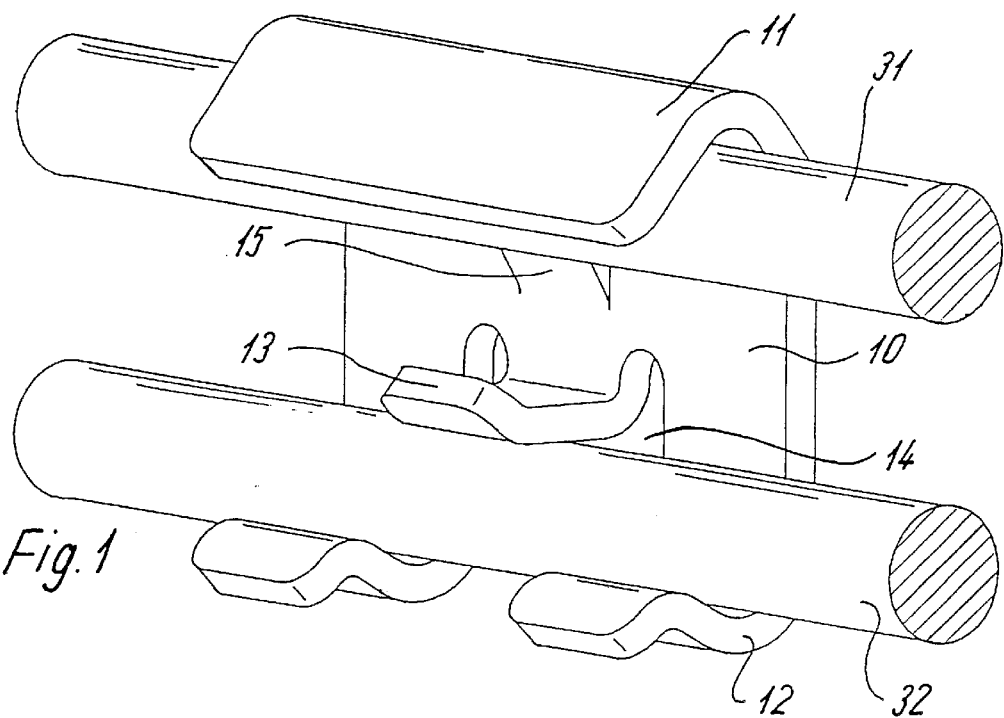
Fig. 1
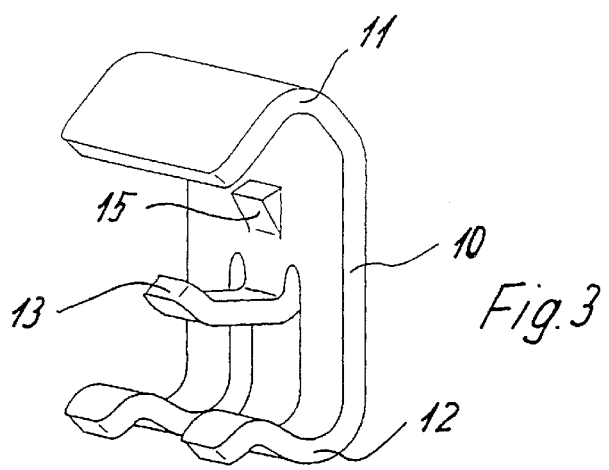
Fig. 2
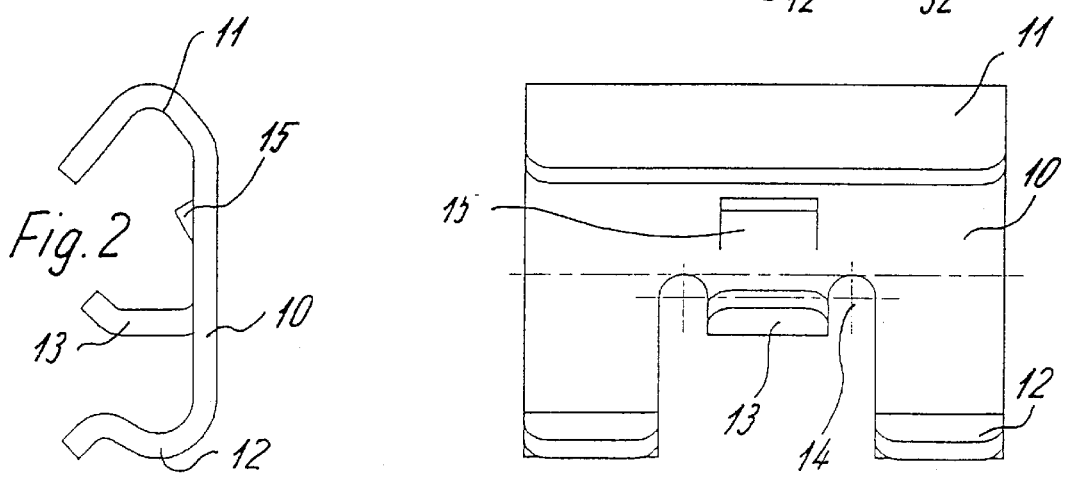
Fig. 4
Fig. 3

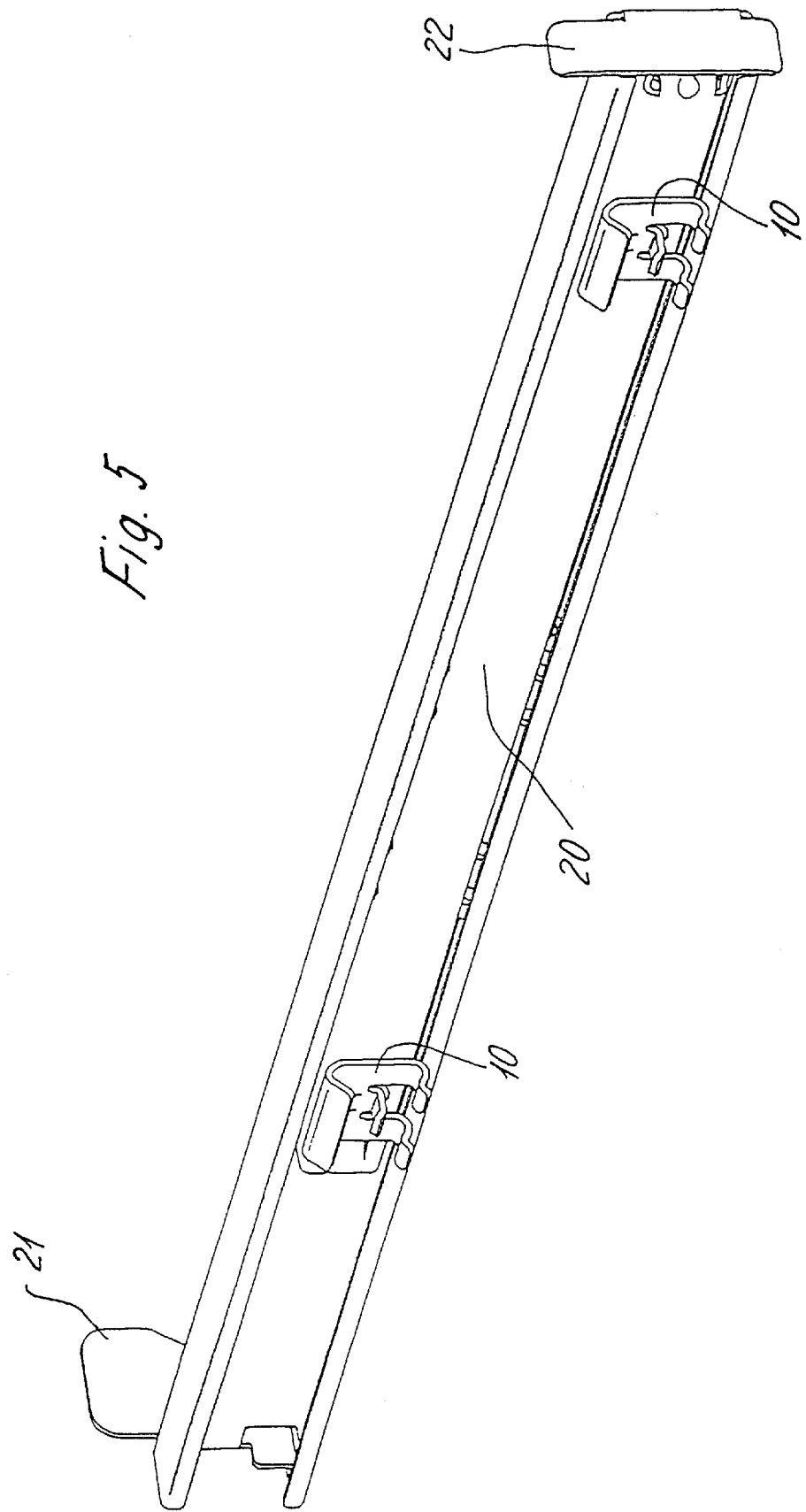

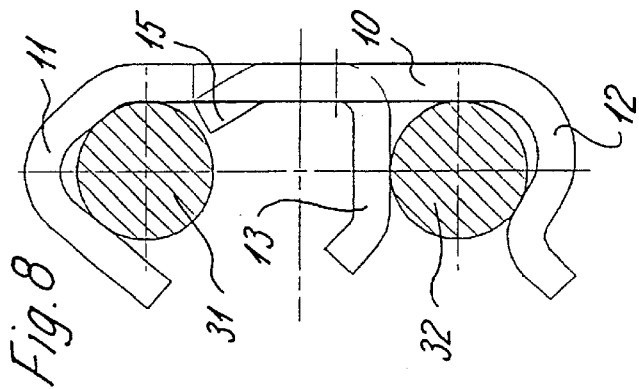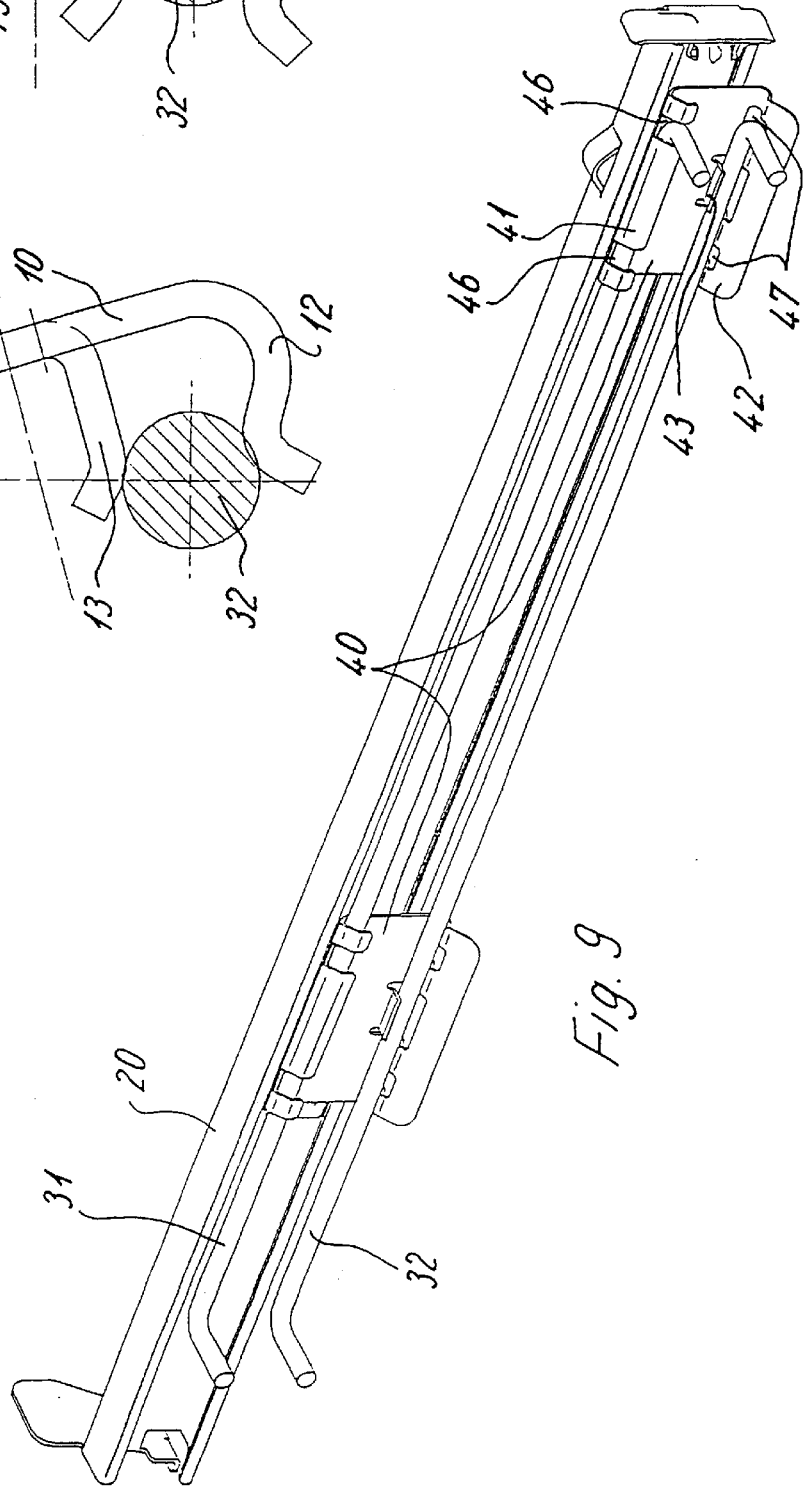

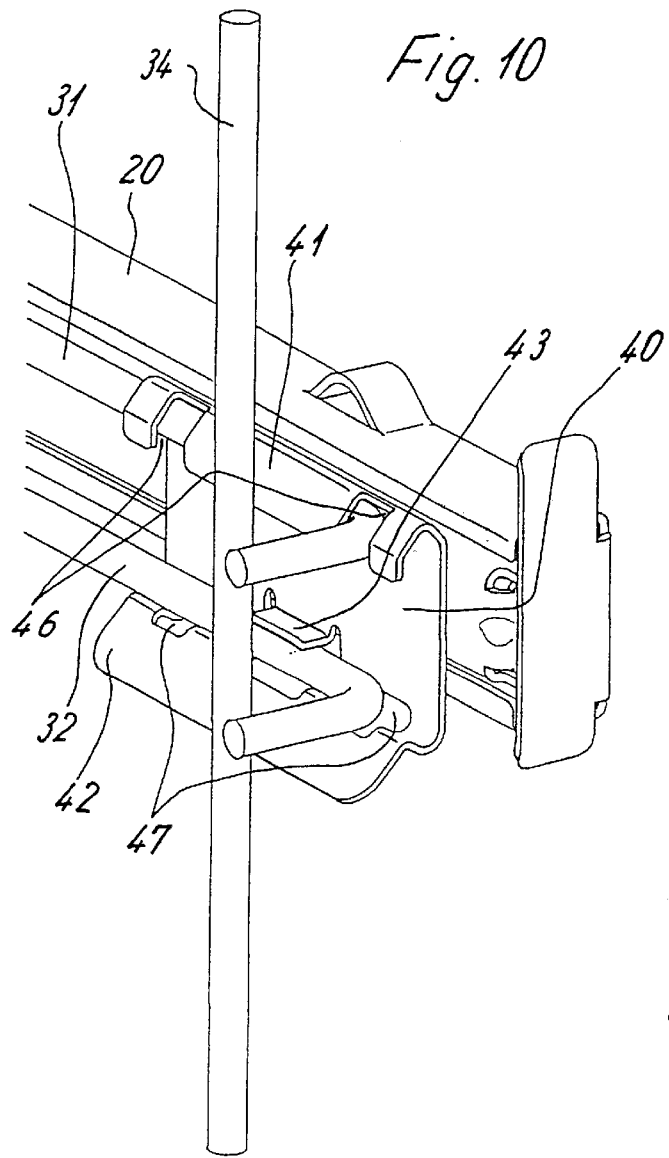
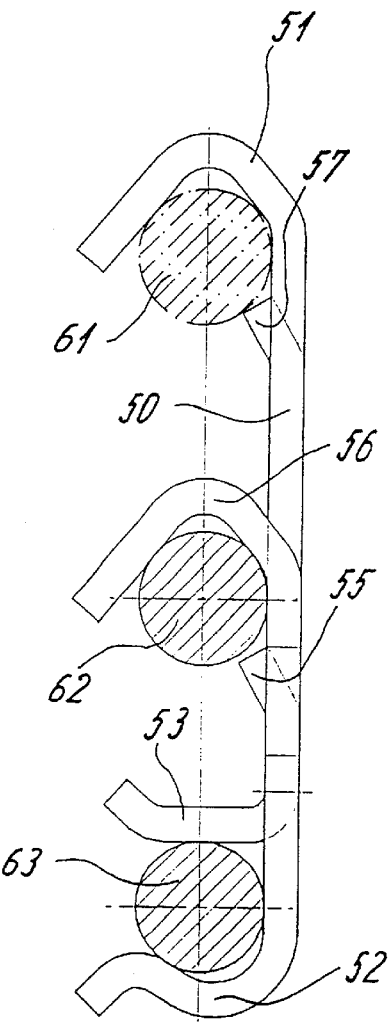

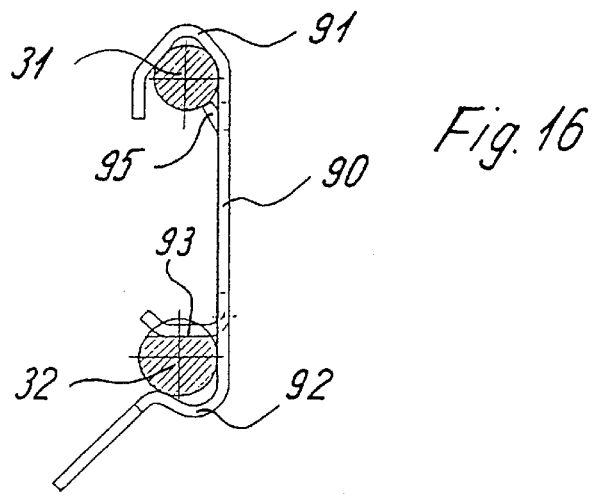
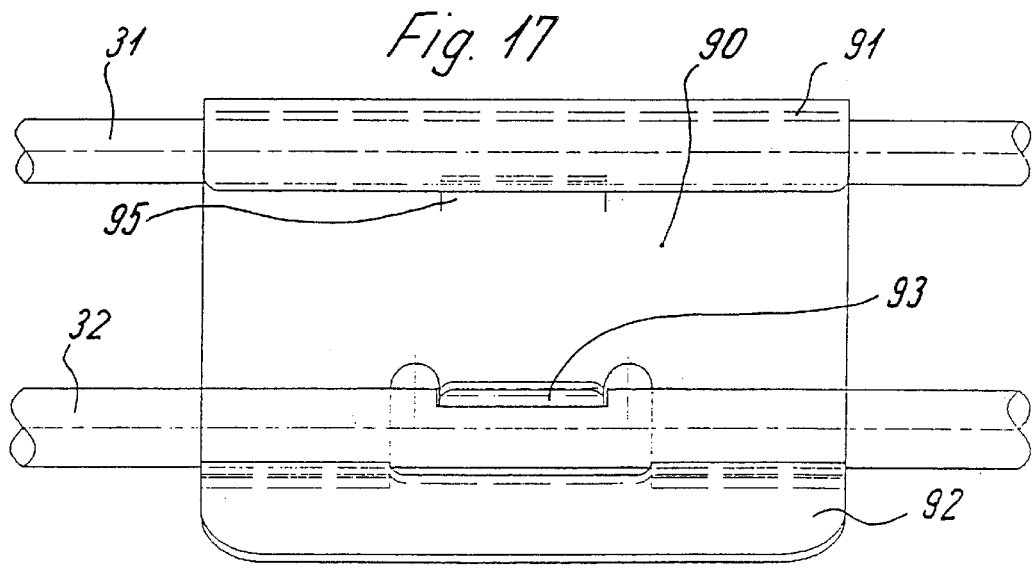
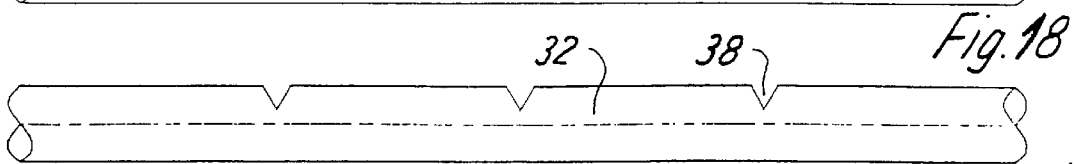
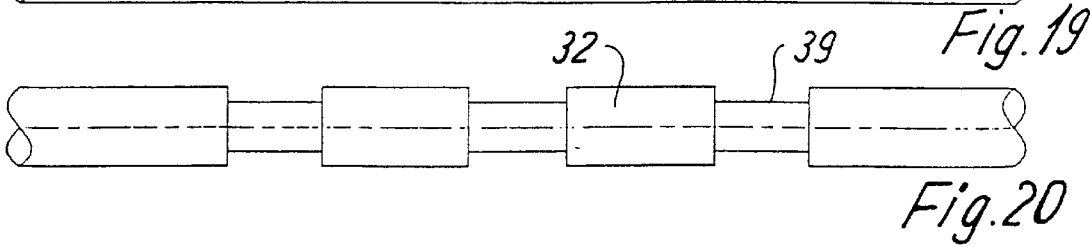

QUICK FIXING ELEMENT

BACKGROUND AND SUMMARY OF THE INVENTION

The present invention relates generally to a quick-fixing element and more particularly quick-fixing elements for fixing guide rails on lattice-like lateral parts which are formed, for example, of wire or rods. These lateral parts can be found in household appliances, such as dishwashers, baking ovens, etc., a use in other pieces of furniture also being conceivable.

In the case of lattice, which can be fastened in household appliances or furniture, several mutually parallel extending horizontal rods are usually provided which are fixed on vertical rods. The horizontal rods may be bent at right angles in order to project into the interior of the household appliance so that shelf bottoms, baking sheets or lattice-type baskets can be slid between the lattice bars. In order to extend the pull-out length of such inserts, which can be slid in, or to facilitate the pull-out movement by using special sliding, rolling or ball bearing guides, guide rails are also fixed to the lateral parts. This fixing of the guide rails takes place by a screwing-on of a countersheet or a snapping-in by sheet metal clips mounted on the guide rails.

The present sheet metal clips have an essentially C-shaped construction and, by means of an upper section, reach around an upper rod and, by means of the lower section, reach around a lower rod of the lateral element. However, these sheet metal clips have the disadvantage that, when stressed, the upper bearing rod may bend downward and the lower rod will disengage from the sheet metal clip. This can open the connection when the upper rod deforms. Also in the event of slight deformations, the sheet metal clip no longer holds on to the rods in a form-locking manner and may therefore rattle. In addition, the known sheet metal clips will be secured, with respect to a displacement along the rods, only when they rest on lateral stops. Locking of the sheet metal clips in both directions along the rod is not provided.

It is therefore an object of the present invention to provide a quick-fixing element which is securely held on the lateral part even under the effect of considerable forces, and which can be used for different lattice types. In addition, the quick-fixing element should be easy to mount.

This object is achieved by means of a quick-fixing element of the present invention.

When a nose is provided on the quick-fixing element between the upper and the lower holding section and rests against the second lower rod of the lateral part, the quick-fixing element maintains the distance between the two rods even during considerable vertical loading. This prevents the rods from moving away from one another and possibly detach the quick-fixing element. In addition, a load on the quick-fixing element is distributed on both rods, so that higher vertical loads can be absorbed.

According to a preferred embodiment of the invention, the quick-fixing element is made of a bendable material and the lower holding section with the nose forms a snap connection. As a result, the quick-fixing element can be fixed in a simple manner on the lattice-type lateral part. In addition, the snap connection holds the quick-fixing element in a form-locking and force-locking manner on the lateral part, so that no rattling noises can occur.

Also, a second nose may be provided between the lower and the upper holding section which, when the first rod bends toward the second rod, will rest on the second rod. This second nose therefore forms a stop for the upper rod, so that, also during lateral loads and/or stressing from the downward direction, the two rods maintain a uniform distance from one another and the forces are transmitted to both rods.

For a manufacturing of the quick-fixing element at reasonable cost, this element is preferably constructed in one piece from a metal sheet. In this case, the noses can be produced by stamping and bending, so that only a few working steps are required during the manufacturing. It is also possible to manufacture the quick-fixing element from other material, such as plastic.

According to another embodiment of the invention, recesses are provided in the upper and/or lower holding section. A right-angle bend of the first or second rod or a rod which extends perpendicularly to the first rod can be inserted into the recesses. In this manner, the quick-fixing element can be fixed on the lateral part, so that a displacement along the rods is not possible. As an alternative, profilings can be provided on the rods, so that sections provided on the quick-fixing element engage the profilings on the rods in order to prevent a displacement. Instead of the recesses, projections, thickenings or other elements can also be provided for the fixing.

According to another embodiment of the invention, at least one center section is provided between the upper and the lower holding section, which center section partially reaches around another rod of the lateral part. When loads are particularly large, it may be advantageous to distribute the load on the quick-fixing element to three or more rods, so that the corresponding number of holding sections are to be provided on the quick-fixing element.

According to the invention, a pull-out guide is provided on which at least one quick-fixing element according to the invention is provided.

Other objects, advantages and novel features of the present invention will become apparent from the following detailed description of the invention when considered in conjunction with the accompanying drawings.

BRIEF DESCRIPTION OF THE DRAWINGS

FIG. 1 is a perspective view of a first embodiment of a quick-fixing element according to the present invention;

FIG. 2 is a lateral view of the quick-fixing element of FIG. 1;

FIG. 3 is a perspective view of the quick-fixing element of FIG. 1;

FIG. 4 is a top view of the quick-fixing element of FIG. 1;

FIG. 5 is a perspective view of a pull-out guide with two mounted fixing elements according to FIG. 1;

FIG. 7 is a lateral view of the quick-fixing element according to FIG. 1 during the mounting;

FIG. 8 is a lateral view of the quick-fixing element of FIG. 1 in the mounted condition;

FIG. 9 is a perspective view of a second embodiment in which two quick-fixing elements are provided on a pull-out guide;

FIG. 10 is an enlarged view of a mounted quick-fixing element of FIG. 9;

FIG. 11 is a lateral view of a quick-fixing element according to a third embodiment;

FIG. 16 is a lateral view of a sixth embodiment of a quick-fixing element according to the invention;

FIG. 17 is a top view of the quick-fixing element of FIG. 16;

FIGS. 18, 19 and 20 are views of different embodiments of rods on which additional quick-fixing elements according to the invention can be mounted.

DETAILED DESCRIPTION OF THE PREFERRED EMBODIMENTS

Figure 6:
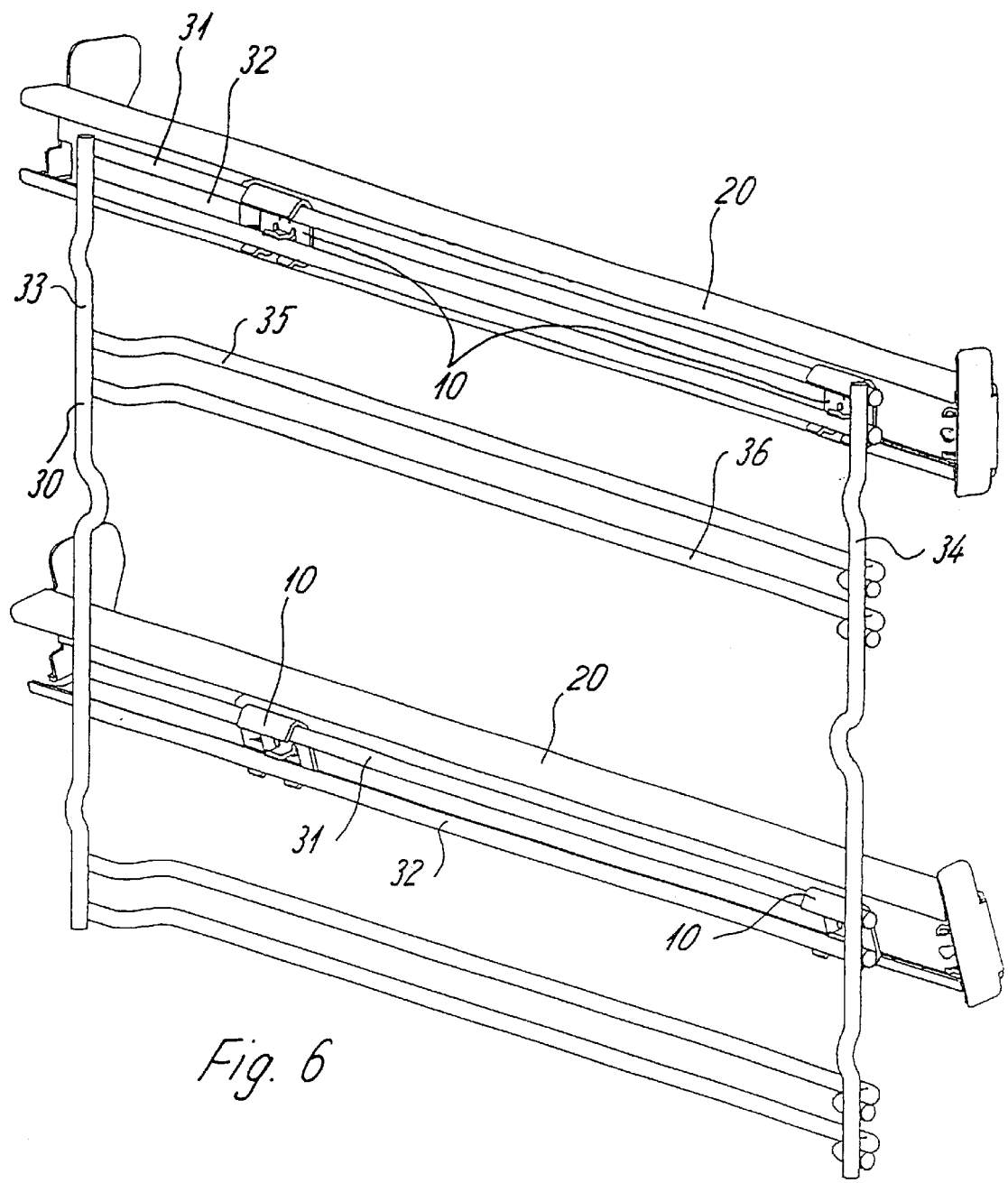
FIG. 6 is a perspective view of two pull-out guides according to FIG. 5 which are mounted on a lateral part.

A quick-fixing element 10, illustrated in FIGS. 1 to 4, has spaced upper holding section 11 and lower holding section 12. Between the two holding sections, a nose is provided which projects from the quick-fixing element 10. A gap 14 is formed between the nose 13 and the lower holding section 12. In addition, a nose 15 is punched out in the quick-fixing element 10 and points to the upper holding section 11.

As illustrated in FIG. 8, the upper holding section 11 reaches around a first rod 31, a small gap being formed between the nose 15 and the rod 31. On the lower holding section 12, a second rod 32 is provided which is clamped between the nose 13 and the lower holding section 12.

FIG. 5 illustrates a pull-out guide 20 on which the two quick-fixing elements 10 are mounted. The pull-out guide 20 comprises a sliding, ball bearing or rolling guide as well as end stops 21, 22 which are not shown and described in detail. By way of the two quick-fixing elements 10, the pull-out guide 20 can be fixed on a lattice-like lateral part. It is also possible to use the quick-fixing elements 10 for mounting a movable lateral part.

FIG. 6 shows a lattice-like lateral part 30 which has a first rod 31 and a second rod 32 on which two quick-fixing elements 10 are mounted. The lateral part 30 also has a rear vertical rod 33 and a front vertical rod 34. The front quick-fixing element 10 rests on the front vertical rod 34, so that a movement of the quick-fixing element 10 toward the front is not possible. The lateral part 30 also has two rods 35 and 36, which are bent at right angles and which point in the direction of the household appliance or of the piece of furniture and can be used for the mounting or guiding of additional elements.

In the lower area of the lateral part 30, two rods 31 and 32 are provided on which a pull-out guide 20 with two quick-fixing elements 10 is being mounted. For this purpose, the pull-out guide 20 is first hung into the quick-fixing elements 10 and is swivelled about the upper rod 31. This process is illustrated in the sectional views of FIGS. 7 and 8. First, the upper section 11 is guided around the rod 31 so that there is a partial reaching around the upper rod 31. Then the lower section 12 and the nose 13 are pressed against the rod 32, so that the nose 13 and the lower section 12 move apart and, in the manner of a snap connection, reach around the lower rod 32. Because the quick-fixing element 10 is made of an elastic metal sheet, the nose 13 and the lower section 12 rest form-lockingly against the lower rod 32.

In the mounted condition, when a vertical load occurs from above, the nose 13 keeps the distance between the rods 31 and 32 essentially constant. As a result, the force absorption is made more uniform and it prevents the connection between the quick-fixing elements from opening up. In the event of a lateral loading or a loading from below, the nose 15 ensures that the upper rod 31 also moves upward as the rod 32 bends more, so that the distance between the rods 31 and 32 is essentially kept constant.

FIGS. 9 and 10 illustrate a second embodiment of a quick-fixing element 40 according to the invention which is mounted on a pull-out guide 20. The quick-fixing element 40 has an upper holding section 41, a lower holding section 42 as well as a nose 43 which rest against a lower rod 32. Two recesses 46 are provided in the upper holding section 41, a right-angle bend of the rod 31 reaching through one recess 46. The lower holding section 42 also has two recesses 47, the lower rod 32 reaching through one recess 47. The two right-angle bends of the rods 31 and 32 fix the quick-fixing element 40, so that it cannot be displaced along the rods 31 and 32. It is also possible to position profilings or vertical rods through the recesses 46 and 47 in order to prevent a displacement of the quick-fixing element 40.

FIG. 11 shows a third embodiment of a quick-fixing element 50 which has a center holding section 56 between an upper holding section 51 and a lower holding section 52. The holding sections 51, 52 and 56 each partially reach around a rod 61, 62 and 63, the rods being secured by way of noses 53, 55 and 57. As a result of the accommodation of three rods 61, 62, 63 on the quick-fixing element 50, higher forces can be absorbed, so that this quick-fixing element 50 can also be used for large loads. It is also conceivable to provide more holding sections for corresponding rods.

Figure 12:
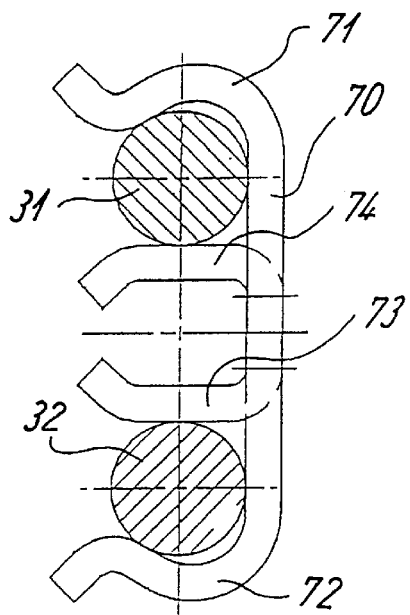
FIG. 12 is a lateral view of a quick-fixing element according to a fourth embodiment.

FIG. 12 shows another embodiment of a quick-fixing element 70, in the case of which an upper rod 31 and a lower rod 32 are surrounded in a force-locking manner by the quick-fixing element 70. For this purpose, a nose 74 is constructed opposite the upper holding section 71 and a nose 73 is constructed opposite the lower holding section 72, which noses rest in the mounted condition against the rods 31 and 32. The symmetry of the quick-fixing elements 70 requires no separate parts for right or left side walls, which facilitates the mounting. In addition, no positionally precise mounting is required in the sense of above or below because the quick-fixing element is also constructed to be mirror-image about a horizontal plane.

Figure 13:
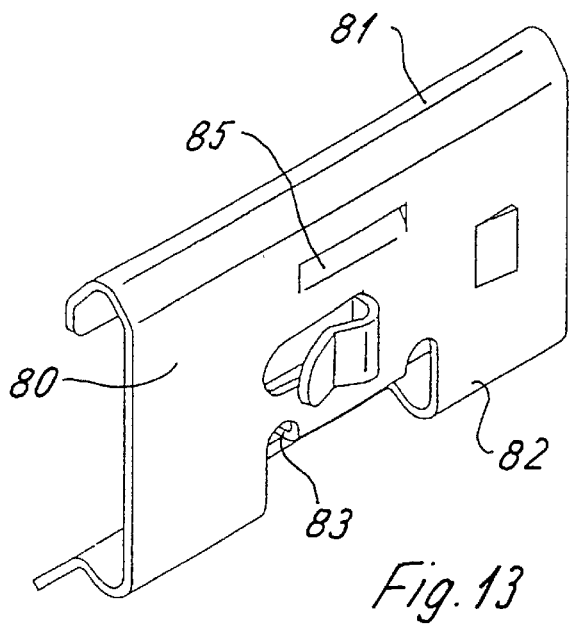
FIG. 13 is a perspective view of a quick-fixing element according to a fifth embodiment.
Figure 14:
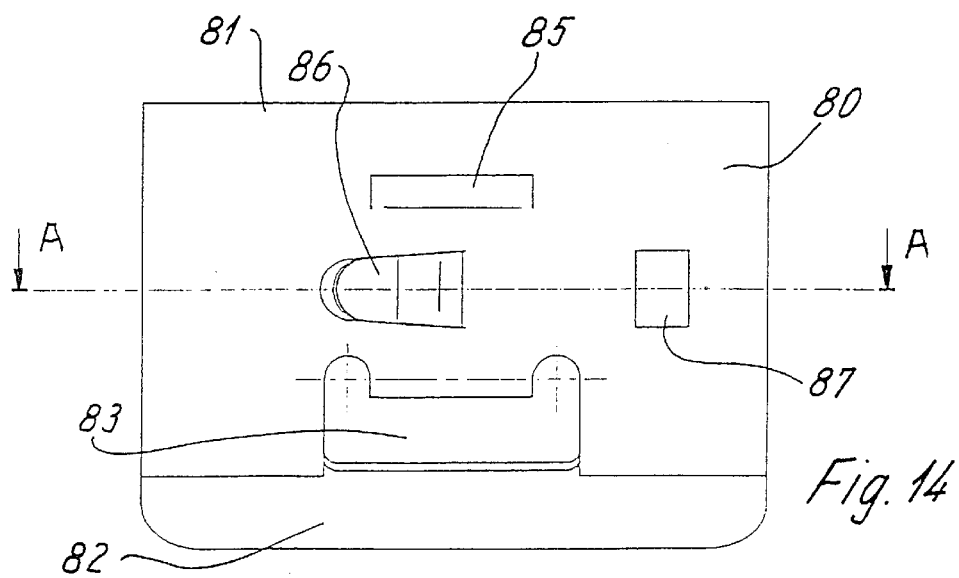
FIG. 14 is a top view of the quick-fixing element of FIG. 13.
Figure 15:
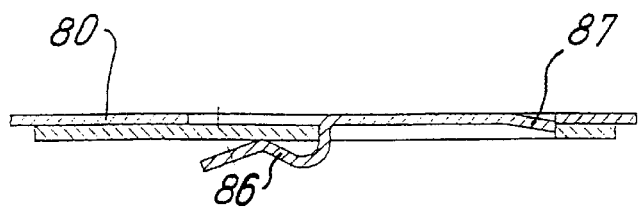
FIG. 15 is a sectional view along Line A—A of FIG. 14.

FIGS. 13 to 15 show another embodiment of a quick-fixing element 80. The quick-fixing element 80 has an upper holding section 81, a lower holding section 82, and noses 83 and 85 between the holding sections 81 and 82. In addition, a profiling including a bent holding nose 86 and a detent nose 87 are provided between the upper holding section 81 and the lower holding section 82. Holding nose 86 and detent nose 87 permit a quick disconnectible connection between the pull-out guide 20 and the quick fastening element 10. The detent nose 87 prevents an unintentional displacement and thus an unintentional disconnecting (FIG. 15).

In the case of the embodiment illustrated in FIGS. 16 and 17, a quick-fixing element 90 is fixed by way of an upper holding section 91 and a lower holding section 92 on two rods 31 and 32. The lower rod 32 has a recess 94 into which the nose 93 of the quick-fixing element 90 engages. As a result, the quick-fixing element 90 is secured against a displacement of the rod 32. FIG. 18 shows a correspondingly constructed rod with recesses 37.

Instead of the nose 93, other holding elements can also be provided on the quick-fixing device 90, which engage, for example, in notches 38 on the rod 32 (FIG. 19). In addition, recesses 39 can be provided on the rod 32, so that clamping elements engage in adjacent recesses 39 and reach around thickened sections on the rod 32 (FIG. 20).

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A quick-fixing element for fixing guide rails on lattice-like lateral parts, the quick fixing element comprises:
    an upper holding section which reaches at least partially around a first rod of a lateral part;
    a lower holding section which reaches at least partially around a second rod of the lateral part which extends essentially parallel to the first rod;
    recesses in the upper and/or lower holding section for receiving a right-angle bend of the first or second rod or a rod extending perpendicularly to the first rod and fixing the quick-fixing element to the lateral part; and
    a nose between the upper and the lower holding sections, which nose rests on the second lower rod of the lateral part.

2. A quick-fixing element for fixing guide rails on lattice-like lateral parts, the quick fixing element comprises:
    an upper holding section which reaches at least partially around a first rod of a lateral part inclusing means for supporting the first rod;
    a lower holding section which reaches at least partially around a second rod of the lateral part which extends essentially parallel to the first rod;
    a nose between the upper and the lower holding sections, which nose rests on the second lower rod of the lateral part; and
    wherein the means for supporting the first rod comprises a nose between the upper and the lower holding sections, the nose extending in a direction essentially parallel to the first rod a distance less than the extent of the quick fixing element and which nose rests on the upper rod of the lateral part.

* * * * *